US005898764A

United States Patent [19]

Yoshida

[11] Patent Number: 5,898,764

[45] Date of Patent: Apr. 27, 1999

[54] DATA COMMUNICATION APPARATUS

[75] Inventor: Takehiro Yoshida, Tokyo, Japan

[73] Assignee: Canon Kabushiki Kaisha, Tokyo, Japan

[21] Appl. No.: 08/757,332

[22] Filed: Nov. 27, 1996

[30] Foreign Application Priority Data

Nov. 30, 1995 [JP] Japan .................................... 7-335827

[51] Int. Cl.$^{6}$ .................................................... H04M 11/00

[52] U.S. Cl. .................... 379/100.17; 379/28; 379/93.34

[58] Field of Search ......................... 379/100.01, 100.05, 379/100.06, 100.17, 398, 400, 28, 93.08, 93.34; 358/405, 406, 434–439, 442, 443, 446, 447; 375/231, 232

[56] References Cited

U.S. PATENT DOCUMENTS

| | | | |
|---|---|---|---|
| 4,868,852 | 9/1989 | Tsumura | 379/100.17 |
| 5,150,400 | 9/1992 | Ukegawa | 379/100.17 |
| 5,323,451 | 6/1994 | Yatsunami | 379/100.01 |
| 5,708,703 | 1/1998 | Nagaraj | 379/400 |

FOREIGN PATENT DOCUMENTS

| | | |
|---|---|---|
| 63-65772 | 3/1988 | Japan . |
| 4-72904 | 3/1992 | Japan . |

*Primary Examiner*—Wing F. Chan
*Attorney, Agent, or Firm*—Fitzpatric, Cella, Harper & Scinto

[57] ABSTRACT

A data communication apparatus automatically sets a signal send condition in accordance with an actual communication status. If the data communication apparatus accommodates a plurality of lines, a call is made from a first line to a second line and a predetermined signal is sent from the first line to the second line, and based on the received information, a signal send condition contained therein is determined and registered.

12 Claims, 12 Drawing Sheets

| FIG. 1A | FIG. 1B |
|---|---|

| FIG. 7A | FIG. 7B |
|---|---|

DATA COMMUNICATION APPARATUS

BACKGROUND OF THE INVENTION

1. Field of the Invention

The present invention relates to the setting of a signal send condition in a data communication apparatus such as a facsimile apparatus.

2. Related Background Art

In the prior art, when a signal is to be sent from a facsimile apparatus, the following adjustment may be made. First, a send level of a signal can be set from 0 dBm to 15 dBm at 1 dB pitch. Secondly, an amplitude characteristic to frequency of a fixed amplitude equalizer can be corrected in order to correct a line characteristic of a subscriber cable, although this feature may not be provided depending on the apparatus. Specifically, the setting of 1.8 km, 3.6 km, 5.4 km or 7.2 km may be made, and the longer the distance is, the larger is the amount of increase of a send level in a high frequency band to a send level in a low frequency band.

However, in the prior art, the correction values of those send levels and the fixed amplitude equalizer are initially set prior to shipment from the factory, and when the apparatus is installed at a user site, it is set with an initial setting. When many communication errors are encountered, a service man changes the setting as required. Since the change of the correction values of the send level and the fixed amplitude equalizer are made by the service man, the cost therefor is substantial.

SUMMARY OF THE INVENTION

It is an object of the present invention to improve a data communication apparatus.

It is another object of the present invention to provide a data communication apparatus which allows automatic setting of a signal send condition in accordance with an actual communication status.

DETAILED DESCRIPTION OF THE PREFERRED EMBODIMENTS

First Embodiment

Figures 1, 1A:
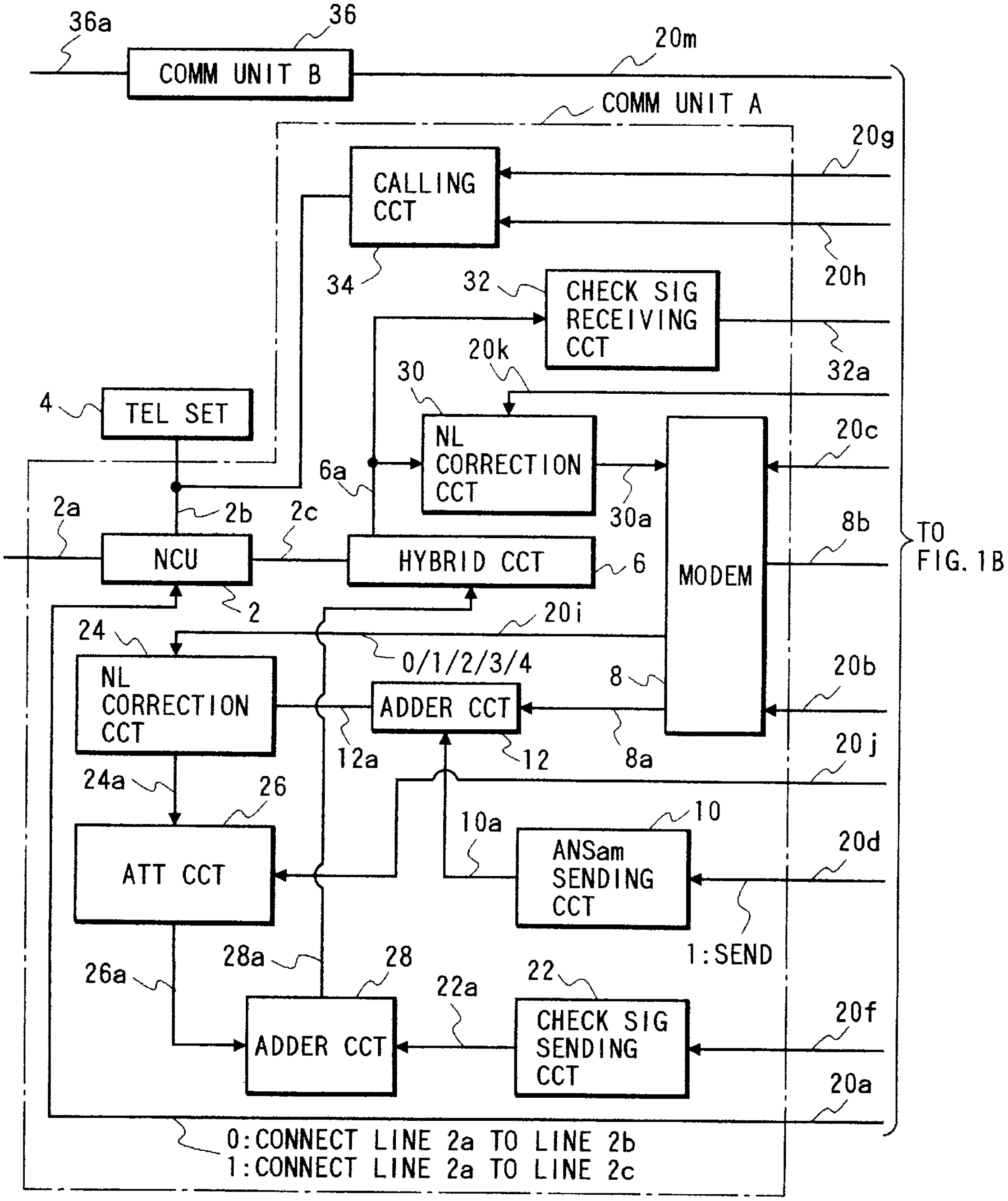
FIG. 1, comprised of FIGS. 1A and 1B, shows a block diagram of a first embodiment of the present invention.
Figure 1B:
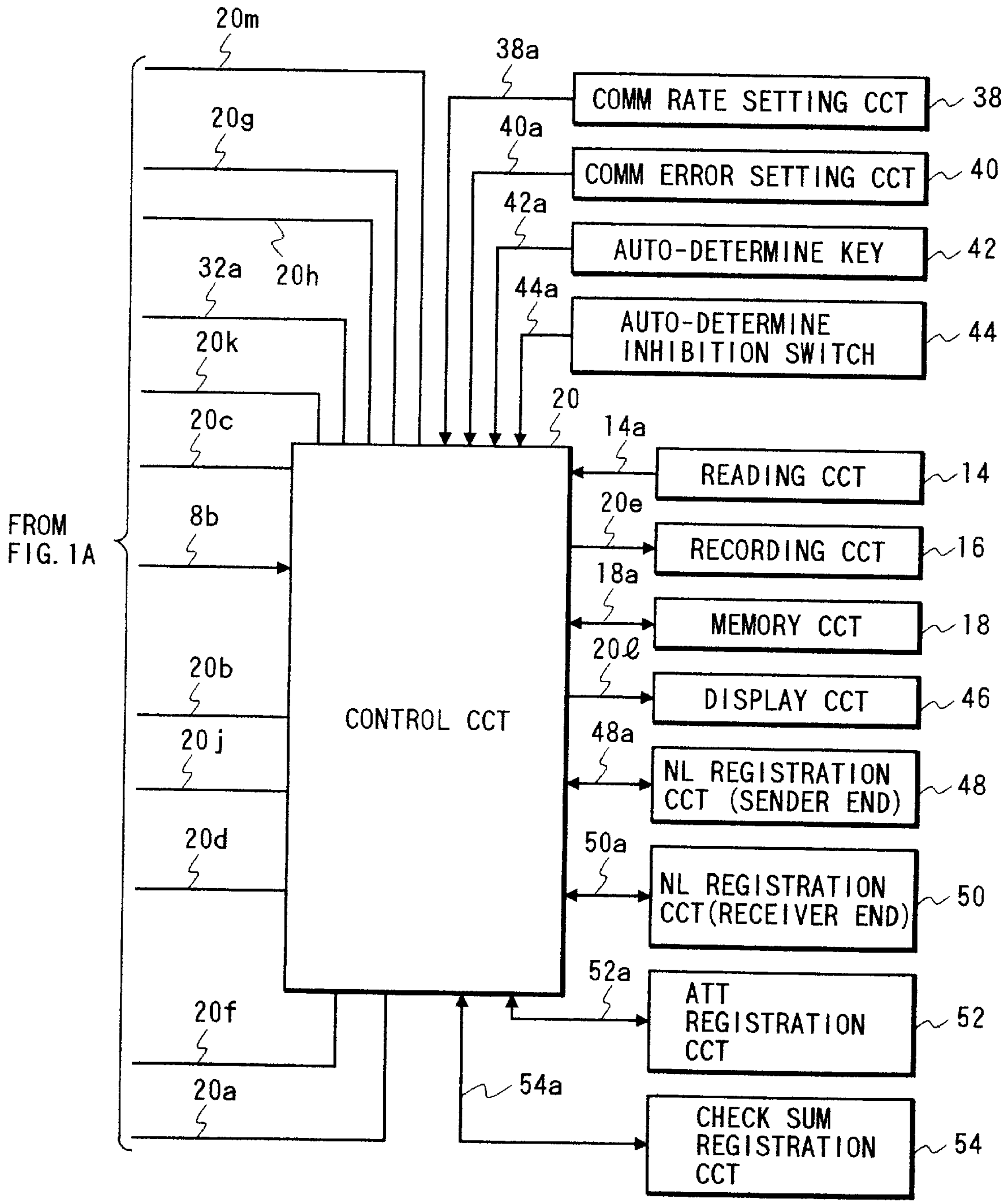

FIGS. 1A and 1B show block diagrams of a configuration of a facsimile apparatus in accordance with a first embodiment of the present invention.

An NCU (network control unit) 2 connects a telephone network to a telephone line terminal for use for data communication, controls the connection of a telephone switching network, switches a data communication line and holds a loop. When a signal level (signal line 20*a*) from a control circuit 20 is "0", the NCU 2 connects a telephone line 2*a* to the telephone set, and when the signal level is "1", it connects the telephone line 2*a* to a facsimile apparatus. In a normal state, the telephone line 2*a* is connected to a telephone set 4.

A hybrid circuit 6 separates a transmission channel signal and a receiving channel signal, sends a transmitted signal from an adder circuit 28 to the telephone line 2*a* through the NCU 2, receives a signal from a destination station through the NCU 2 and sends it to a modem 8 through a signal line 6*a*.

The modem 8 conducts the modulation and demodulation in accordance with the ITU-T Recommendations V.8, V.21, V.27ter, V.29, V.17 and V.34 and a transmission mode is designated by a signal line 20*c*. The modem 8 receives a signal outputted to a signal line 20*b*, outputs modulated data to a signal line 8*a*, receives a received signal outputted to the signal line 6*a* and outputs demodulated data to a signal line 8*b*.

An ANSam send circuit 10 sends an ANSam signal. When a signal of a signal level "1" is outputted to a signal line 20*d*, it sends the ANSam signal to a signal line 10*a*, and when a signal of a signal level "0" is outputted to the signal line 20*d*, it does not output a signal to the signal line 10*a*.

An adder circuit 12 receives information on the signal line 8*a* and information on the signal line 10*a* and outputs a sum signal to a signal line 12*a*. A read circuit 14 reads an image of a document sheet and outputs read data to a signal line 14*a*. A record circuit 16 sequentially records, one line at a time, the information outputted on a signal line 20*e*.

A memory circuit 18 is used to store raw information of the read data or coded information and store received information or decoded information.

A check signal send circuit 22 sends a check signal of a line status. When a send pulse occurs in a signal line 20*f*, it sends a line probing signal (L1) defined by the ITU Recommendation V.34. The line probing signal L1 is a periodic signal repeated at 150±0.01% Hz and it is synthesized by tone (cosine) groups derived by dividing the frequencies of 150 Hz to 3750 Hz at an interval of 150 Hz. Tones of 900 Hz, 1200 Hz, 1800 Hz and 2400 Hz are not used.

Phases of 150, 450, 600, 750, 1050, 1350, 1500, 1950, 2100, 2550, 2850, 3600 and 3750 Hz are 0 degree, and phases of 300, 1650, 2250, 2700, 3000, 3150, 3300 and 3450 Hz are 180 degrees. It is higher than a steady state voltage level by 6 dB and set for 160 ms (number of times of repetition: 24).

A fixed amplitude equalizer (NL (non-loaded) correction circuit) 24 receives the information on the signal line 12*a* and outputs a signal corrected to fit to a characteristic of a subscriber line to a signal line 24*a*. When a signal "0" is outputted to a signal line 20*i*, no correction is made. When a signal "1" is outputted, correction for subscriber cable length of 1.8 km is made. Similarly, when signals "2", "3" and "4" are outputted, corrections of subscriber cable length of 3.6 km, 5.4 km and 7.2 km, respectively, are made.

An ATT (attenuation) circuit 26 receives the information on the signal line 24*a* and outputs a signal attenuated by dB value corresponding to a value outputted to a signal line 20*j* to a signal line 26*a*.

An adder circuit 28 receives the signal outputted on the signal line 22*a* and the signal outputted on the signal line 26*a*, adds them and outputs sum information to a signal line 28*a*.

A fixed amplitude equalizer (NL (non-loaded) correction circuit) 30 is identical to the fixed amplitude equalizer 24. It receives the information on the signal line 6*a* and sends a signal corrected to fit to the characteristic of the subscriber cable to a signal line 30*a*. When a signal "0" is outputted, no correction is made, and when a signal "1" is outputted, correction of subscriber cable length of 1.8 km is made. Similarly, when signals "2", "3" and "4" are outputted, corrections of subscriber cable length of 3.6 km, 5.4 km and 7.2 km, respectively, are made.

A check signal receive circuit 32 receives the information on the signal line 6*a* to receive a check signal and determines a characteristic of the line. Specifically, it determines an attenuation amount of the telephone line and a vibration characteristic for frequency.

More specifically, it calls a line B (for example, the line of the signal line 36*a*) from a line A (for example, the line of the signal line 2*a*) and determines a turn-over line characteristic of the subscriber cable.

When a call command occurs on a signal line 20*h*, a call circuit 34 receives telephone number information outputted on a signal line 20*g* and outputs a select signal to the signal line 2*b*.

The NCU 2, the hybrid circuit 6, the modem 8, the ANSam send circuit 10, the adder circuit 12, the check signal send circuit 22, the fixed amplitude equalizers 24 and 30, the ATT circuit 26, the adder circuit 28, the check signal receive circuit 32 and the call circuit 34 are referred to as a communication unit A.

A communication unit B has the same functional block as that of the communication unit A, and a signal line 36*a* represents a telephone line and a signal line 20*m* includes signal lines identical to the signal lines 20*a*, 20*b*, 20*c*, 20*d*, 20*f*, 20*h*, 20*g*, 8*b* and 32*a*.

A communication rate setting circuit 38 is set to conduct automatic determination and registration if the communication is 7200 b/s or lower five continuous times. This information is outputted to a signal line 38*a*.

A communication error setting circuit 40 is set to conduct the automatic determination and registration if four to more communications out of the past ten communications are in communication error. This information is outputted to a signal line 40*a*.

An automatic determination button 42 is depressed when an operator wants the automatic determination and registration. When this button 42 is depressed, a depression pulse is generated on a signal line 42*a*.

An automatic determination inhibit switch 44 is a switch to inhibit the automatic determination and registration. When this switch 44 is on (inhibit state), a signal of a signal level "1" is outputted on a signal line 44*a*, and when the switch 44 is off (enable state), a signal of a signal level "0" is outputted on the signal line 44*a*.

A display circuit 46 displays a message such as "automatic determination and registration were conducted and send level was set to −8 dBm and NL correction circuit was set to 7.2 km" through a signal line 201.

A registration circuit 48 registers an NL correction value of the transmission station (specifically, 0 km, 1.8 km, 3.6 km, 5.4 km or 7.2 km) through a signal line 48*a*.

A registration circuit 50 registers an NL correction value of the receiving station (specifically, 0 km, 1.8 km, 3.6 km, 5.4 km or 7.2 km) through a signal line 50*a*.

A registration circuit 52 registers an ATT value (specifically, a positive integer dB from 0 to 15) through a signal line 52*a*.

A registration circuit 54 registers a check sum of the circuits 48, 50 and 52 through a signal line 54*a*.

The control circuit 20 controls the overall facsimile apparatus of the present embodiment. In a facsimile apparatus which accommodates a plurality of lines in accordance with a first embodiment of the present invention, it calls from the line A to the line B, sends a check signal and receives it, determines a signal send condition in the communication based on the received information and registers it.

Specifically, it determines the send level (ATT value) in the communication and the characteristic (NL correction value) of the fixed amplitude equalizer in the communication and registers them. The determination and the registration are conducted when a power supply is turned from an off state to an on state in an unregistered state. When the determination and the registration are made, it is displayed on the display circuit 46.

Figure 2:
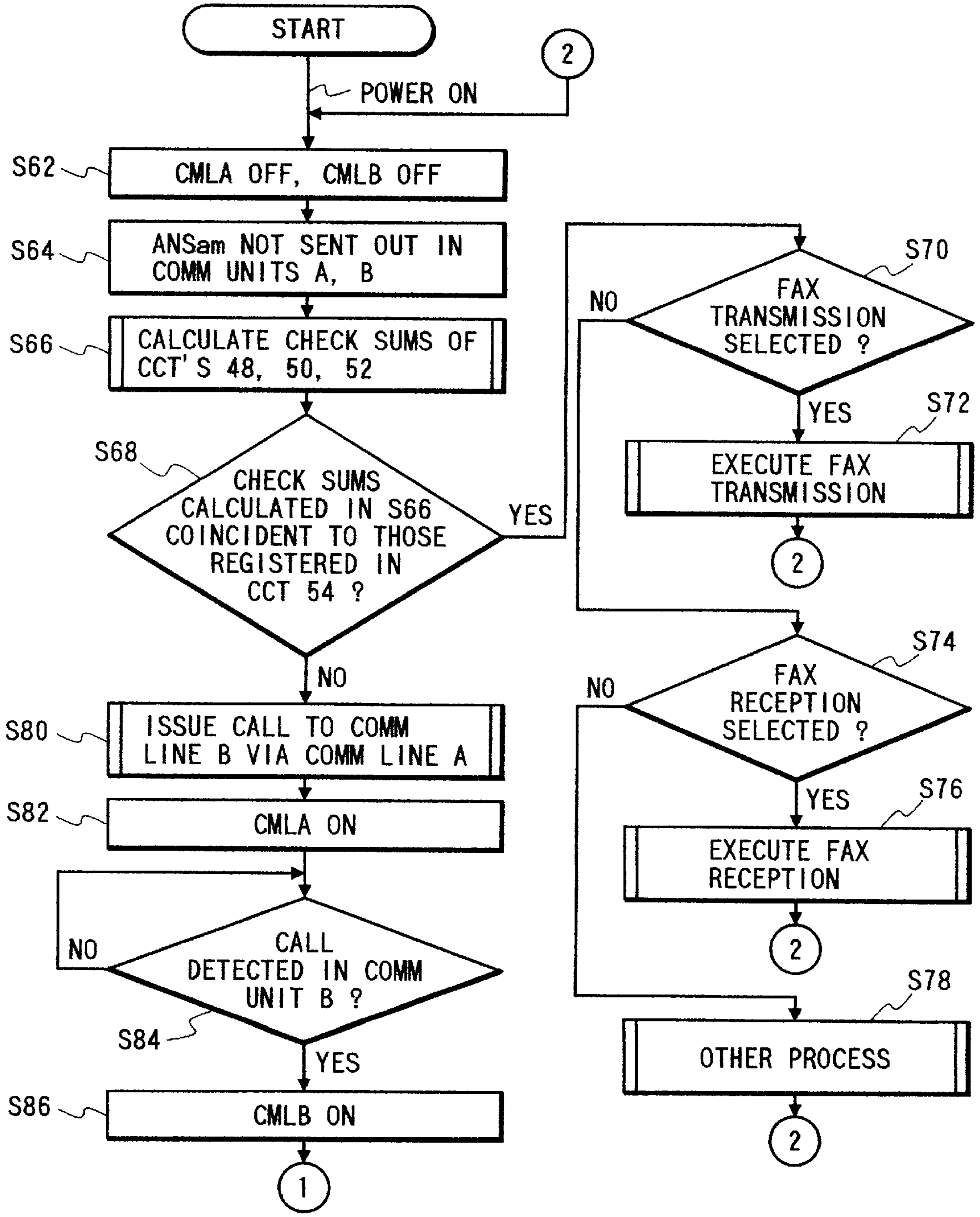
FIG. 2 shows a flow chart of an operation of the first embodiment of the present invention.
Figure 3:
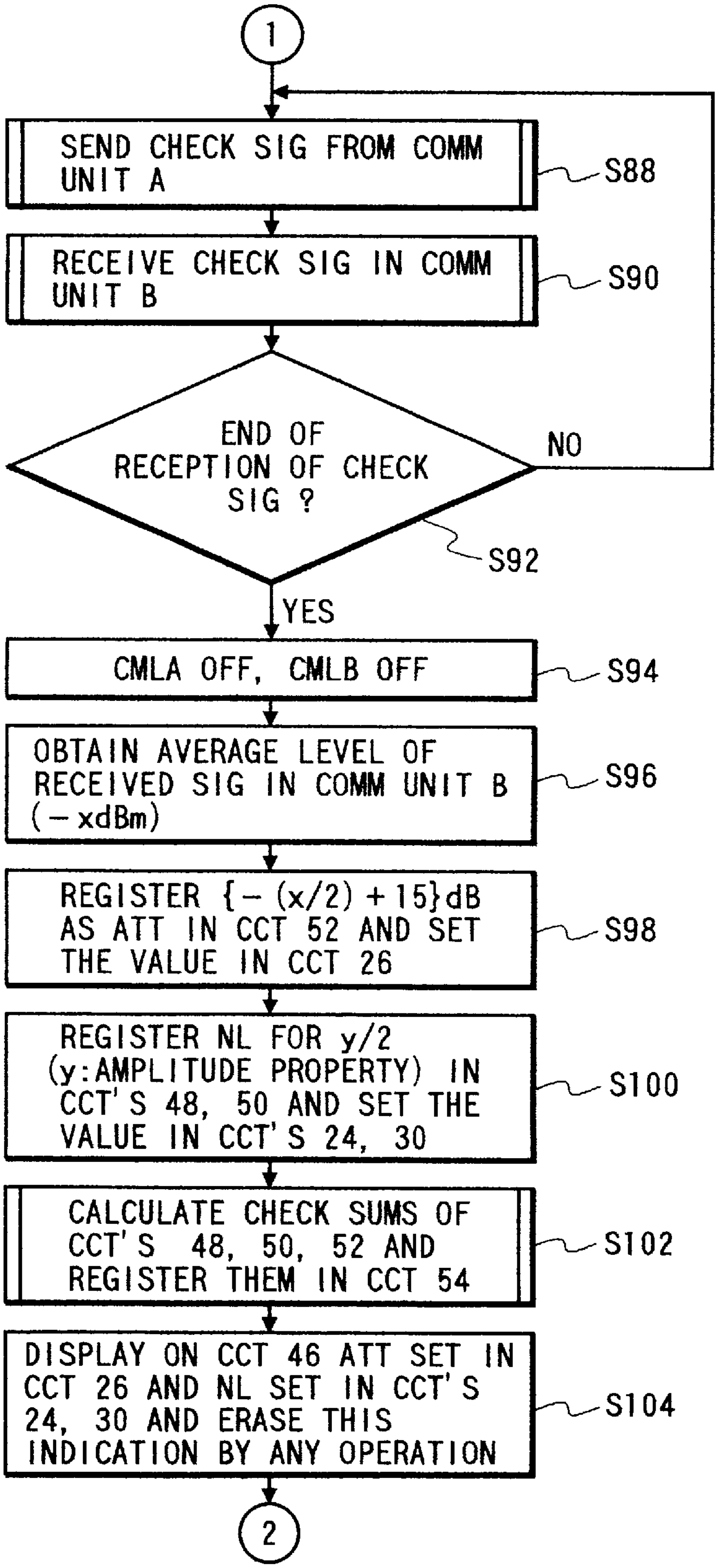
FIG. 3 shows a flow chart of an operation of the first embodiment of the present invention.

FIGS. 2 and 3 show flow charts of control of the control circuit 20 in the present embodiment.

In FIG. 2, when the power supply is turned on from the off states, the control start from "start".

In S62, CMLs (CMLA and CMLB) of the communication units A and B are turned off. In S64, the ANSam signals of the communication units A and B are not sent.

In S66, the check sum of the circuits 48, 50 and 52 are calculated. In S68, whether or not the check sum calculated in S66 is equal to the check sum of the circuit 54 is determined, and if they are not equal, that is, if data is not registered in the circuits 48, 50 and 52, the process proceeds to S80, and if they are equal, that is, if data have been registered in the circuits 48, 50 and 52, the process proceeds to S70.

In S70, whether the facsimile transmission has been selected is determined, and if it has been selected, the process proceeds to S72 to conduct the facsimile communication, and if it has not been selected, the process proceeds to S74.

In S74, whether or not the facsimile reception has been selected is determined, and if it has been selected, the process proceeds to S76 to conduct the facsimile reception, and if it has not been selected, the process proceeds to S78 to conduct other process.

In S80, call is made from the communication unit A, that is, the line A to the communication unit B, that is, the line B. In S82, the CML of the communication unit A is turned on.

In S84, when the communication unit B detects the reception of call, the process proceeds to S86 to turn on the CML of the communication unit B. Thus, the switch-over at an end office of a telephone company, that is, information on up and down lines of the subscriber line characteristic may be determined.

In S88, a send pulse is generated on the signal line 20*f* and a check signal of 0 dBm is sent from the communication unit A to the telephone line by the circuit 22.

In S90, a circuit check signal is received by a block corresponding to the circuit 32 of the communication unit B. In S92, whether or not the reception of the check signal has been completed or not at the communication unit B is determined, and if it is not completed, the process proceeds to S88, and if it is completed, the process proceeds to S94.

In S94, the CMLs are turned off both at the communication unit A and the communication unit B. In S96, a mean signal level received at the communication unit B is assumed as −x dBm, and in S98, the ATT setting is determined to (−x/2+15) dB, and it is registered in the circuit 52 and set in the circuit 26. Since the loss of the subscriber cable at the switch-over point is x, the loss in one way is x/2. Since the signal is sent such that it is −15 dBm at the end office, the ATT loss is (−x/2+15). It is assumed that a signal of 0 dBm is outputted to the signal line 24*a* to which the circuit 26 is connected.

In S100, assuming that an amplitude characteristic to frequency is y, it is y/2 in one way of the subscriber cable and an NL value (fixed amplitude equalizer) for correcting it is registered in the circuits 48 and 50 and set in the circuits 24 and 30.

In S102, the check sum of the circuit 48, 50 and 52 is calculated and it is registered in the circuit 54. In S104, the ATT value set in the circuit 26 and the subscriber cable correction value set in the circuits 24 and 30 are displayed on the display circuit 46 through the signal line 201. This display may be erased by any operator key operation.

In the first embodiment described above, the NL value at the transmission station and the NL value at the receiving station are the same although they may be different.

In the first embodiment, when the ATT value and the NL value are automatically determined and registered, they are displayed on the display circuit 46 although they may be recorded by the record circuit 16.

Second Embodiment

In the first embodiment, the automatic determination and registration of the ATT value and NL value are only conducted once although the determination and registration may be conducted when a designation command is received from an operation unit or a remote unit. When the determination and registration are made, a predetermined destination may be called to send the information thereof.

Figure 4A:
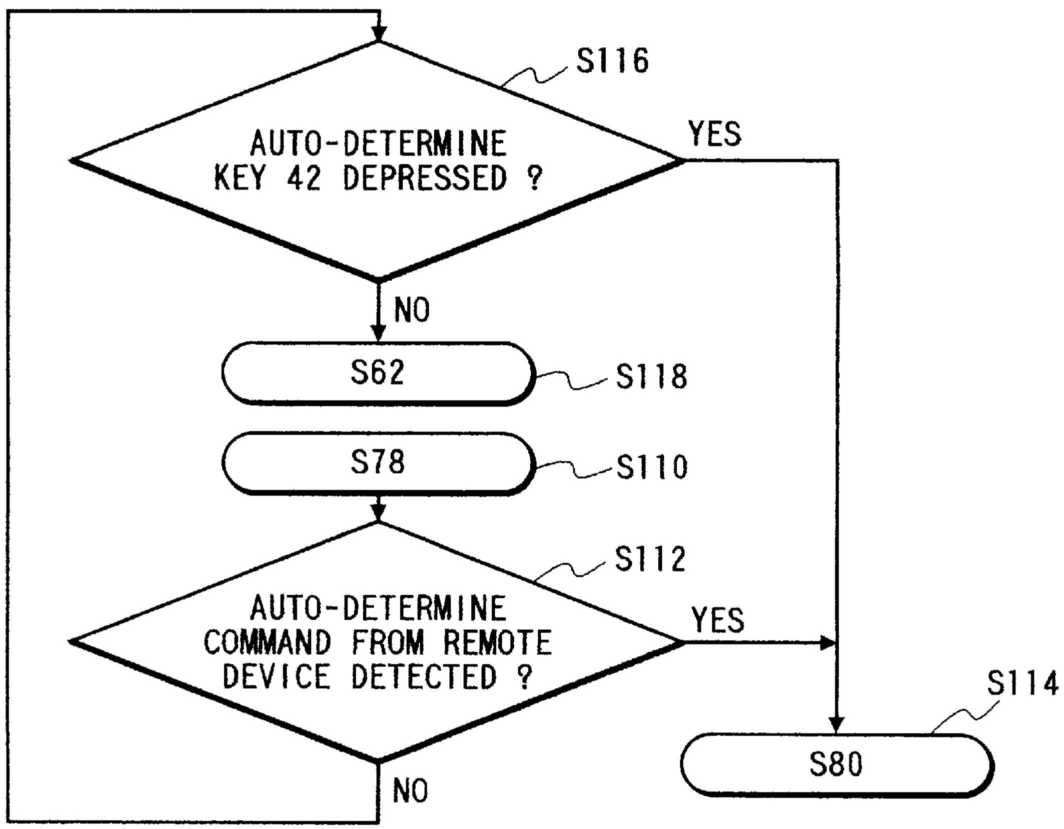
FIGS. 4A and 4B show flow charts of an operation of a second embodiment of the present invention.
Figure 4B:
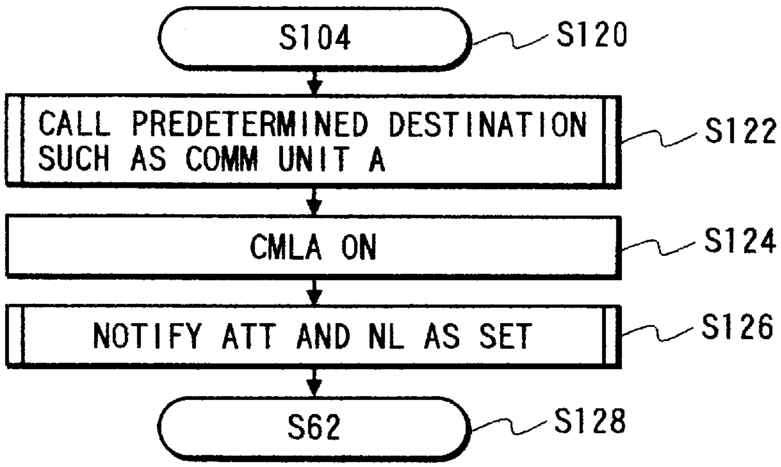

FIGS. 4A and 4B show flow charts of specific control therefor, for those portions which are different from those of the first embodiment.

S110 represents S78 described above. In S112, whether or not the command designation for the automatic determination and registration has been detected from the remote unit in other process is determined, and if it has been detected, the process proceeds to l S114 (S80 described above), and if it has not been detected, the process proceeds to S116.

In S116, the information on the signal line 42*a* is received to determine whether or not the automatic determination button has been depressed, and if it has been depressed, the process proceeds to S118 (S62 described above).

S120 represents S104. In S122, a predetermined destination is called by using the communication unit A, for example. In S124, the CML of the communication unit A is turned on, and in S126, the set ATT value and NL correction value are informed to the predetermined destination. Then, the process proceeds to S62 in S128.

Third Embodiment

In the above embodiments, the automatic determination and registration of the ATT value and the NL value are conducted only once. Alternatively, the determination and registration may be conducted when it is determined that the communication rate is lower than the setting set in the registration circuit 40 or when the communication error is larger than the setting set in the registration circuit 40.

Figure 5A:
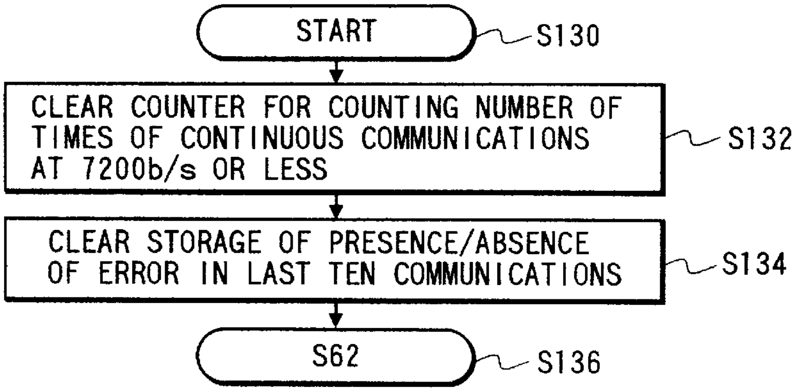
FIGS. 5A and 5B show flow charts of an operation of a third embodiment of the present invention.
Figure 5B:
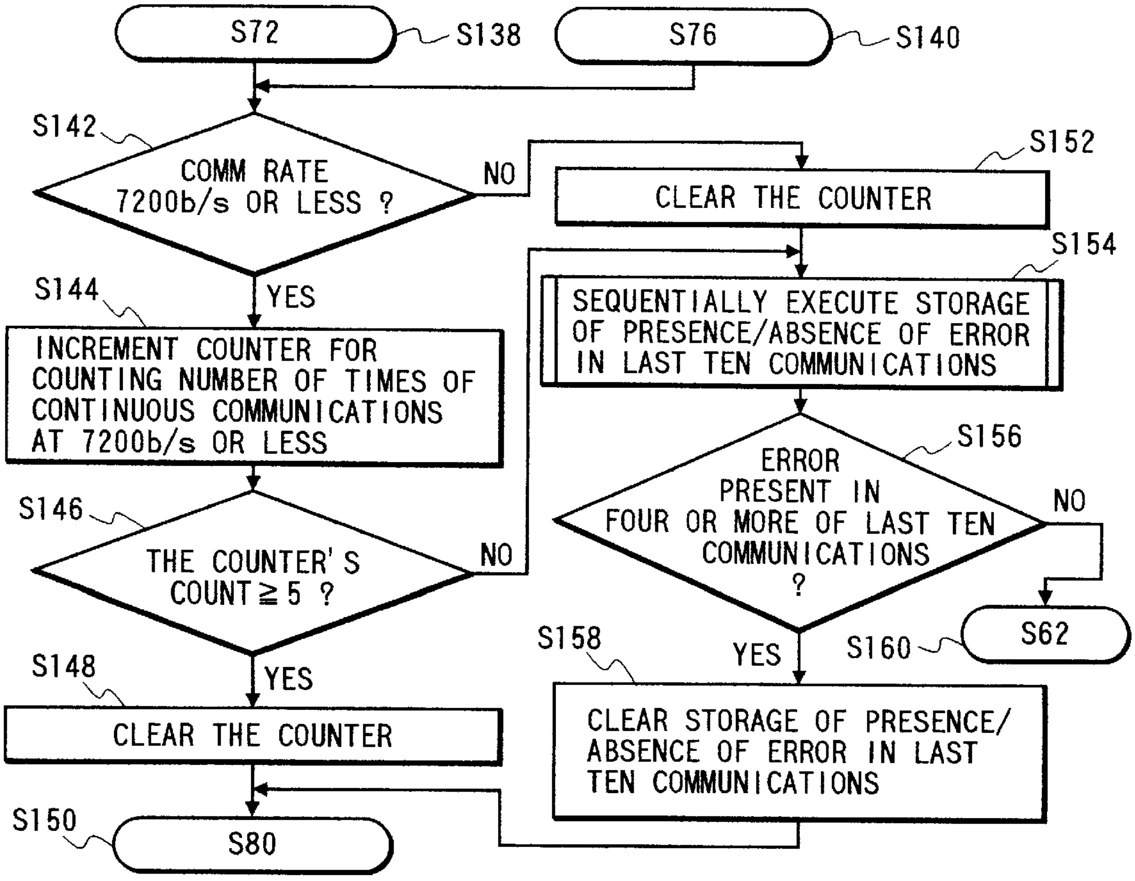

FIGS. 5A and 5B show flow charts of specific control therefor, for only those portions which are different from those of the first embodiment.

In FIG. 5A, S130 represents the "start". In S132, a counter for counting the number of times of continuous communication at 7200 b/s or lower is cleared. In S134, the memory of the presence or absence of the past ten communications is cleared. In S136, the process proceeds to S62.

S138 represents S72 described above, and S140 represents S76 described above. In S142, whether or not the communication at 7200 b/s or lower was included or not is determined, and if the determination is affirmative, the process proceeds to S144, and if the determination is negative, the process proceeds to S152.

In S144, the content of the counter for the continuous communication at 7200 b/s or lower is incremented by one, and in S146, whether or not the count of the continuous communication at 7200 b/s or lower is five or more, that is, the communication at 7200 b/s occurred five times continuously is determined. If the determination is affirmative, the process proceeds to S148 to set 0 to the continuous communication counter at 7200 b/s or lower and the process proceeds to S150 (S80 described above).

If the determination is negative in S146, the process proceeds to S154 to sequentially store the presence or absence of the communication errors of the past ten communications.

In S152, 0 is set to the continuous communication counter at 7200 b/s or lower. In S154, the presence or absence of the communication errors in the past ten communications are sequentially stored.

In S156, whether or not four or more communications out of the past ten communications are in error is determined. If not more than four communication errors are included, the process proceeds to S160 (S62 described above) and if four or more communication errors are included, the process proceeds to S158 to clear the memory of the presence or absence of the communication errors of the past ten communications. Then, the process proceeds to S150 (S80 described above).

Fourth Embodiment

In the above embodiments, a switch to select whether or not the automatic determination and registration of the ATT value and the NL value are to be conducted may be provided and they may be conducted only when selected.

Figure 6:
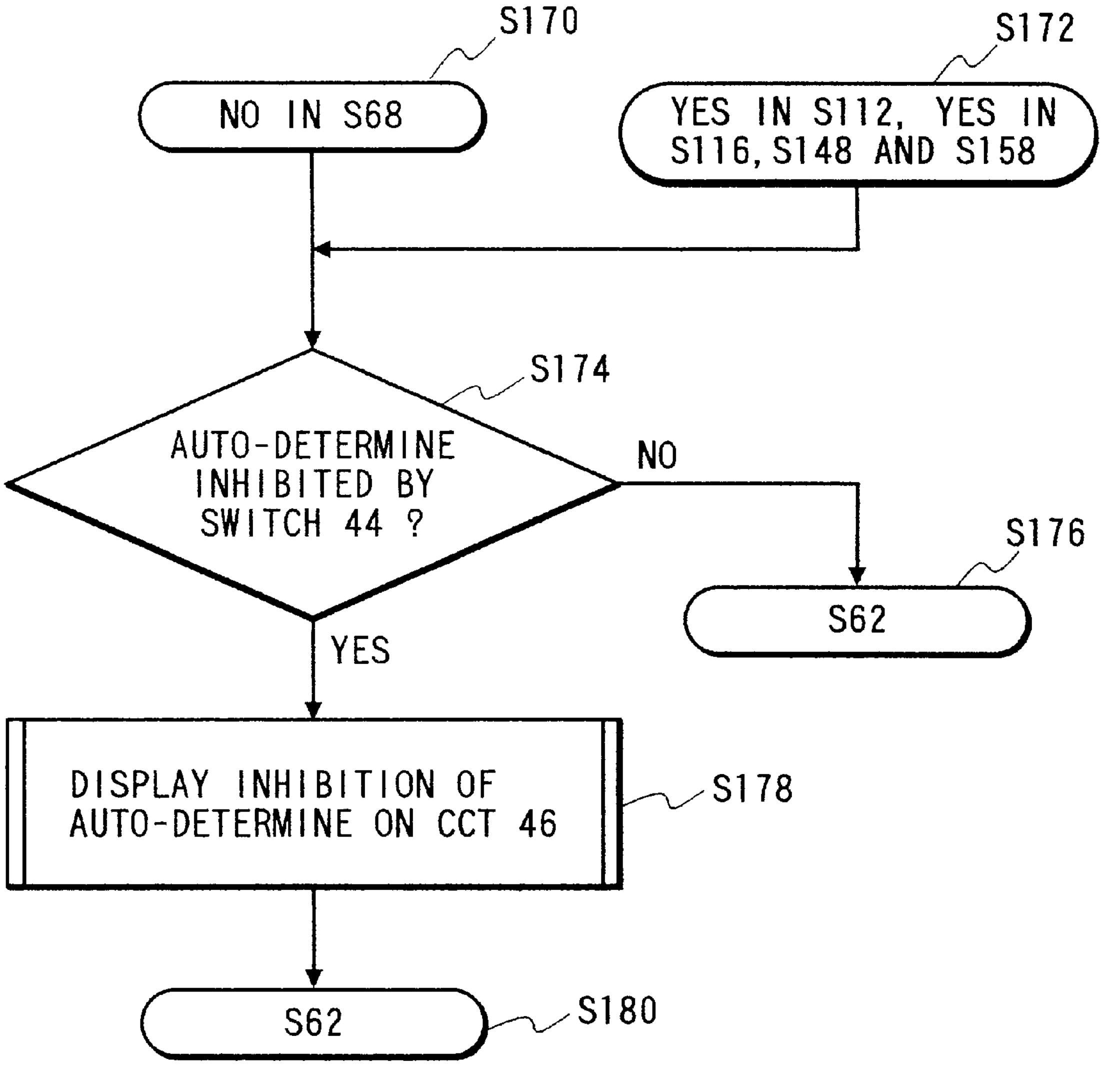
FIG. 6 shows a flow chart of an operation of a fourth embodiment of the present invention, FIG. 7, composed of FIGS. 7A and 7B, shows a block diagram of a fifth embodiment of the present invention

FIG. 6 shows a flow chart of the specific control therefor, for only those portions which are different from those of the first embodiment.

It adds the following control to the step before the step S80. Namely, as steps before the step S80, S170 (NO in S68) and S172 (YES in S112, YES in S116, S148 and S158) are included.

In S174, the information on the signal line 44*a* is received to determine whether or not the automatic registration of the ATT value and the NL value is inhibited by the circuit 44 is determined, and if it is not inhibited, the process proceeds to S176 (S80 described above). If it is inhibited, the process proceeds to S178 and display the inability of the automatic determination and registration of the ATT value and the NL value on the display circuit 46 through the signal line 201 although the timing is to conduct it. The display may be erased by any key operation. Then, the process proceeds to S62 in S180.

Fifth Embodiment

In the above embodiments, one apparatus is provided with two communication units A and B. In this embodiment, one apparatus is provided with only one communication unit and two apparatus are used to check the line status by the operation of a service man or an operator.

The like elements to those of the first embodiment are designated by the like numerals and the explanation thereof is omitted.

Figures 7, 7A:
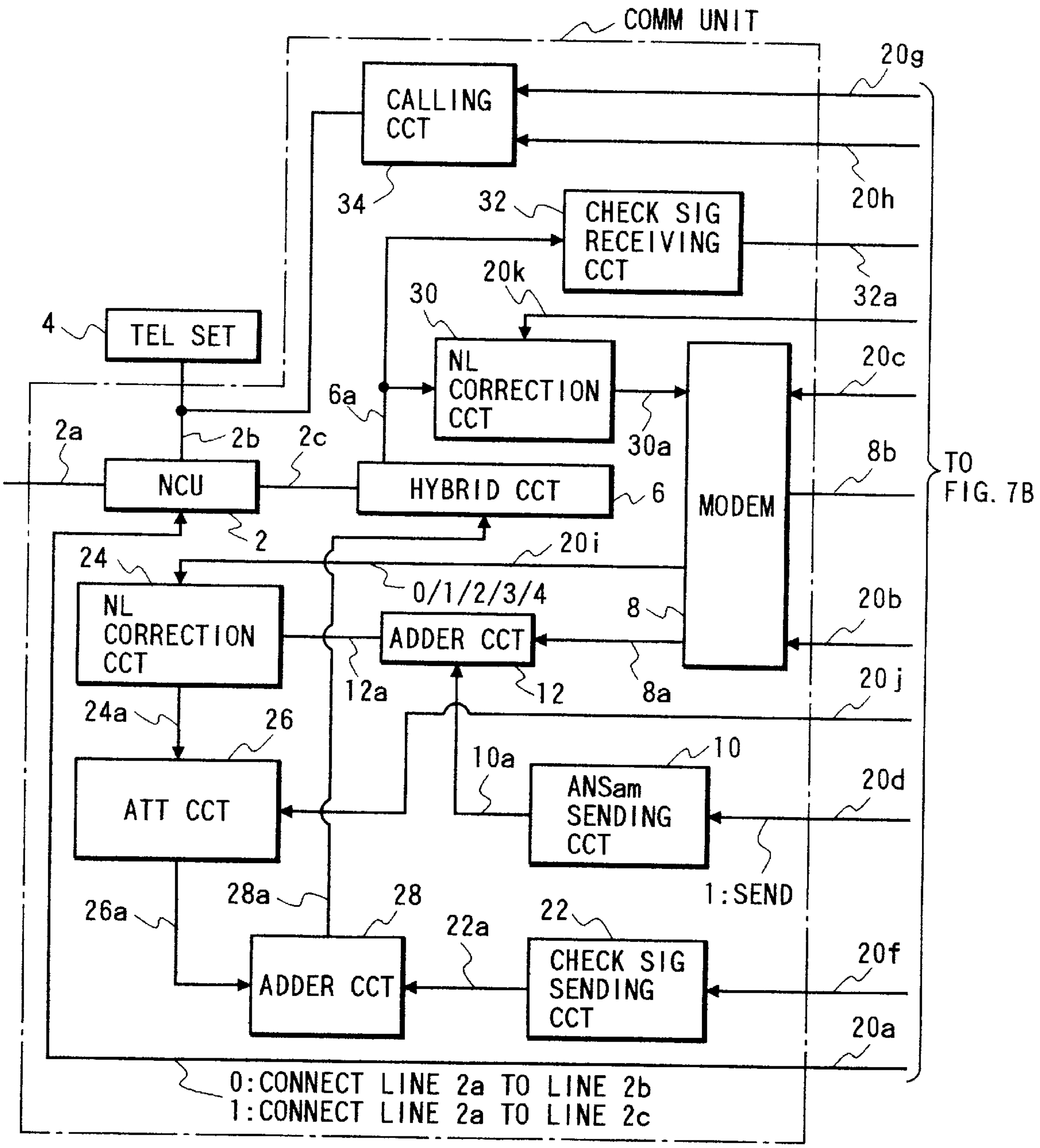
Figure 7B:
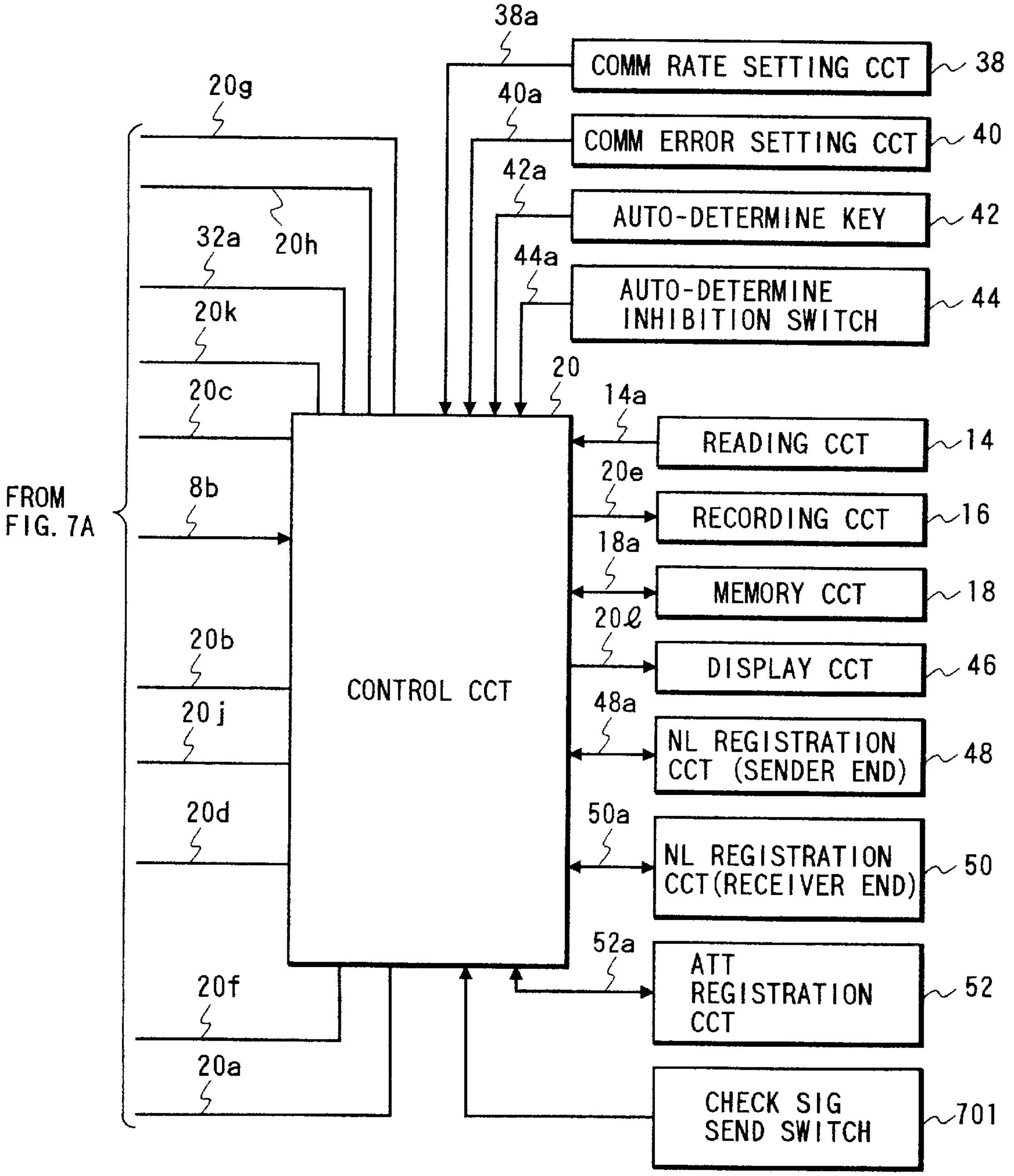

FIGS. 7A and 7B show block diagrams of an apparatus of the present embodiment.

In FIG. 7B, numeral 701 denotes a switch by which the operator instructs the transmission of the check signal.

Figure 8:
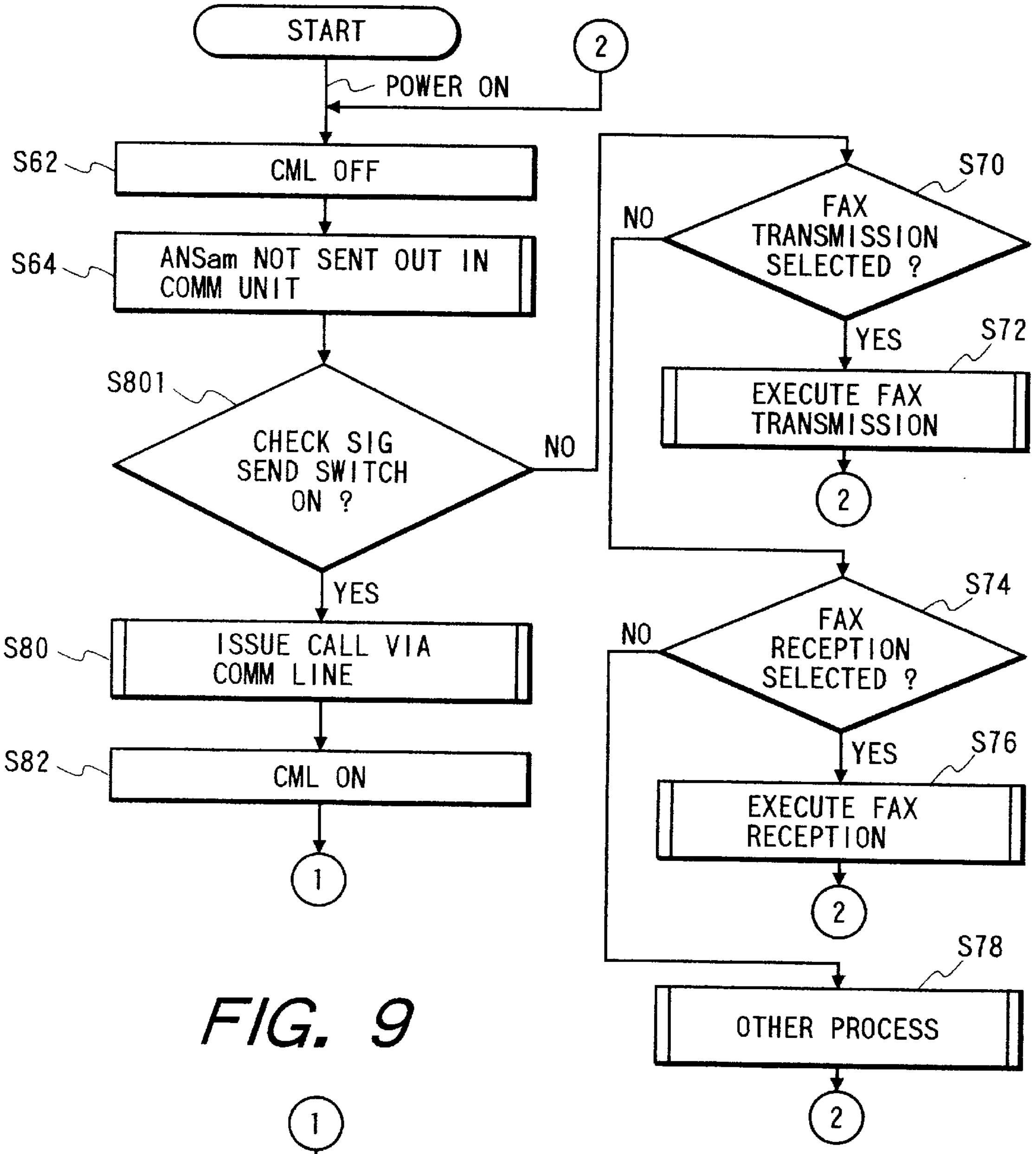
FIGS. 8, 9, 10 and 11 show flow charts of an operation of the fifth embodiment of the present invention.
Figure 9:
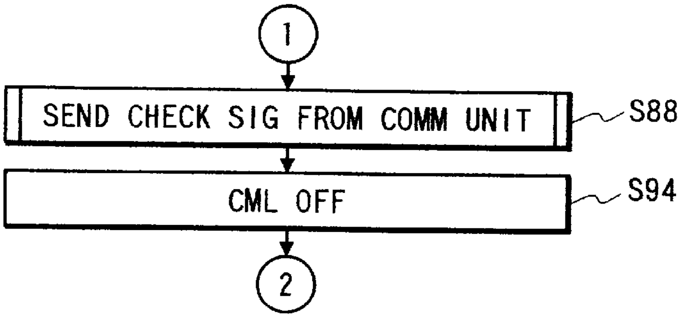

FIGS. 8 and 9 show flow charts of a process of the control unit 20 of the apparatus which sends the check signal in the present embodiment.

In S801 of FIG. 8, whether or not the check signal send switch has been depressed is determined. If it has been depressed, the process proceeds to S80, and if it has not been depressed, the process proceeds to S70.

In S80, call is made to the receiving station of the check signal.

Figure 10:
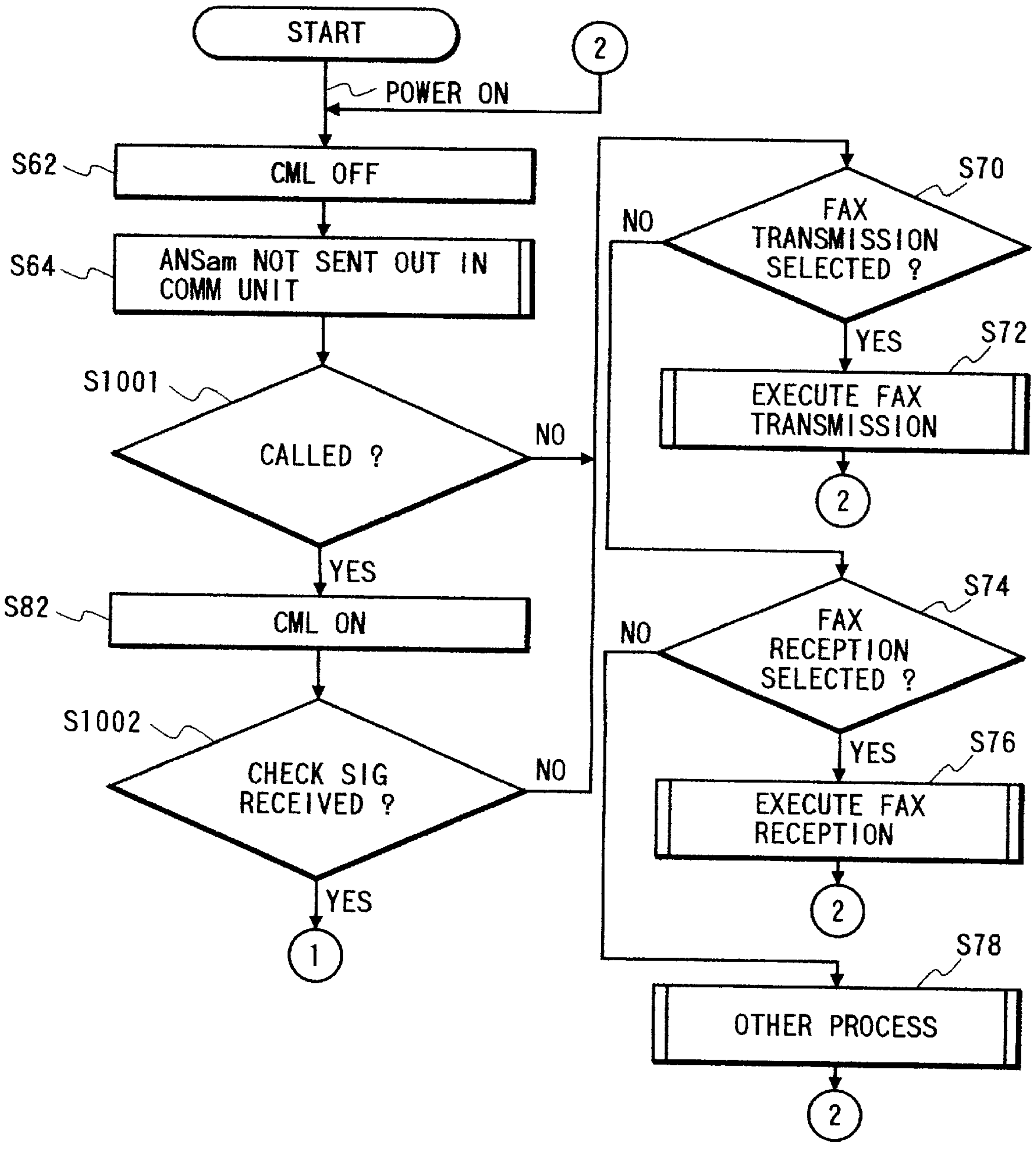
Figure 11:
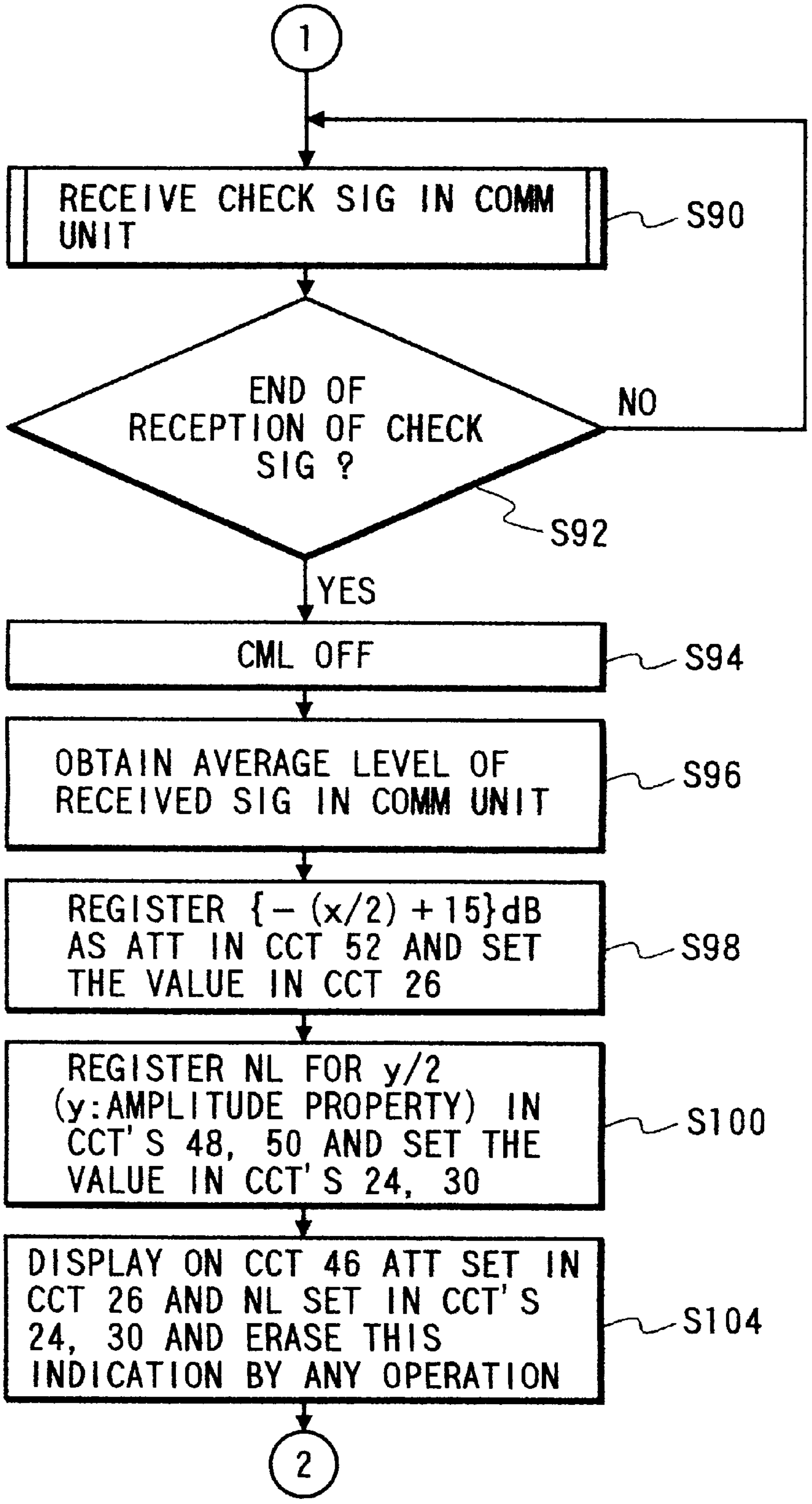

FIGS. 10 and 11 show flow charts of an operation of the control unit 20 of the apparatus which receives the check signal.

In S1001 of FIG. 10, whether or not a call has been received is determined. If the call has been received, the process proceeds to S82, and if the call has not been received, the process proceeds to S70.

In S1002, whether or not the check signal has been received is determined, and if it has been received, the process proceeds to S90, and if it has not been received, the process proceeds to S70.

In the present embodiment, the two apparatus are installed at the same location.

However, when only one telephone line is available at one location, the other apparatus may be installed at other location (for example, service counter).

What is claimed is:

1. A data communication apparatus comprising:

communication means for communicating data, said communication means being connected to a plurality of lines including at least one line A and another line B; and control means for causing said communication means to send from the line A a predetermined signal used to check a line state, by calling from the line A to the line B, and based on a signal received via the line B, determining a data sending condition in the communication.

2. A data communication apparatus according to claim 1 wherein a send level in the communication is determined as the signal send condition in the communication.

3. A data communication apparatus according to claim 1 wherein a characteristic of a fixed amplitude equalizer in the communication is determined as the signal send condition in the communication.

4. A data communication apparatus according to claim 1 wherein the determination and the registration are conducted when a power supply is turned on and off in an unregistered state.

5. A data communication apparatus according to claim 1 wherein the determination and the registration are conducted when it is determined that a communication rate is lower than a set rate.

6. A data communication apparatus according to claim 1 wherein the determination and the registration are conducted when it is determined that a communication error is larger than a set level.

7. A data communication apparatus according to claim 1 wherein the determination and the registration are conducted when a designation command is received from an operation unit or a remote unit.

8. A data communication apparatus according to claim 1 wherein a switch to select whether or not the determination and the registration are conducted is provided.

9. A data communication apparatus according to claim 1 wherein when the determination and the registration are conducted, it is displayed or printed out.

10. A data communication apparatus according to claim 1 wherein when the determination and the registration are conducted, a predetermined destination is dialed to send information thereof.

11. A communication apparatus comprising:

reception means for receiving a check signal for checking a characteristic of a fixed amplitude equalizer of a communication line through the communication line;

determination means for determining the characteristic of the fixed amplitude equalizer of the communication line based on the check signal received by said reception means; and control means for setting a correction value to the fixed amplitude equalizer in accordance with the determined result by said determination means.

12. A communication apparatus comprising:

communication means for communicating data;

reception means for receiving a check signal for measuring an attenuation amount of a signal level of a communication line through the communication line;

determination means for determining the attenuation amount based on the check signal received by said reception means; and control means for setting the attenuation amount of the data signal communicated by said communication means to said communication means in accordance with the determined results by said determination means.

* * * * *

UNITED STATES PATENT AND TRADEMARK OFFICE

CERTIFICATE OF CORRECTION

PATENT NO. : 5,898,764

DATED : April 27, 1999

INVENTOR(S) : TAKEHIRO YOSHIDA

It is certified that error appears in the above-identified patent and that said Letters Patent is hereby corrected as shown below:

<u>COLUMN 4</u> line 56, "or not" should be deleted.

<u>COLUMN 5</u> line 34, "other" should read --another--; and
line 36, "1 S114" should read --S114--.

Signed and Sealed this

Twenty-fifth Day of April, 2000

Attest:

Q. TODD DICKINSON

*Attesting Officer*

*Director of Patents and Trademarks*